(12) United States Patent
Hisada et al.

(10) Patent No.: US 12,119,712 B2
(45) Date of Patent: Oct. 15, 2024

(54) ROTOR OF ROTARY ELECTRIC MACHINE

(71) Applicants: KABUSHIKI KAISHA TOSHIBA, Tokyo (JP); TOSHIBA INFRASTRUCTURE SYSTEMS & SOLUTIONS CORPORATION, Kawasaki (JP)

(72) Inventors: Hideki Hisada, Kuwana (JP); Hiroaki Makino, Fuchu (JP); Hidenori Uchida, Mie (JP)

(73) Assignees: Kabushiki Kaisha Toshiba, Tokyo (JP); Toshiba Infrastructure Systems & Solutions Corporation, Kawasaki (JP)

( * ) Notice: Subject to any disclaimer, the term of this patent is extended or adjusted under 35 U.S.C. 154(b) by 271 days.

(21) Appl. No.: 17/698,133

(22) Filed: Mar. 18, 2022

(65) Prior Publication Data

US 2022/0209600 A1     Jun. 30, 2022

Related U.S. Application Data

(63) Continuation of application No. PCT/JP2020/035584, filed on Sep. 18, 2020.

(30) Foreign Application Priority Data

Sep. 24, 2019   (JP) ................. 2019-173088

(51) Int. Cl.
*H02K 1/28*     (2006.01)
*H02K 1/276*    (2022.01)
*H02K 15/03*    (2006.01)

(52) U.S. Cl.
CPC .............. *H02K 1/28* (2013.01); *H02K 1/276* (2013.01); *H02K 15/03* (2013.01)

(58) Field of Classification Search
CPC ........ H02K 1/276; H02K 1/2766; H02K 1/28; H02K 15/03; Y02T 10/64
See application file for complete search history.

(56) References Cited

U.S. PATENT DOCUMENTS 6,803,692 B2 * 10/2004 Hattori ................. H02K 1/2766
                                                  310/216.106
2012/0200188 A1    8/2012 Sano et al.
(Continued)

FOREIGN PATENT DOCUMENTS

CN    102810919 A    12/2012
JP    04-128056 U    11/1992
(Continued)

OTHER PUBLICATIONS

International Search Report issued Nov. 24, 2020 in PCT/JP2020/035584 filed on Sep. 18, 2020, 2 pages.

*Primary Examiner* — Naishadh N Desai
(74) *Attorney, Agent, or Firm* — Maier & Maier, PLLC

(57) ABSTRACT

According to one embodiment, a rotor includes a rotor core including magnetic poles arranged in a circumferential direction around a central axis, each magnetic pole including at least two magnet holding slots opposed to each other at intervals in the circumferential direction, a first core portion between the two magnet holding slots, a second core portion between the two magnet holding slots and the central axis, and a bridge connecting the first core portion and the second core portion, and permanent magnets each arranged in the magnet holding slot. The bridge includes first center bridges located between the two magnet holding slots and separated from each other in the circumferential direction, and a coupling element that connects the first center bridges to each other.

8 Claims, 5 Drawing Sheets

(56) References Cited

U.S. PATENT DOCUMENTS

| | | | |
|---|---|---|---|
| 2015/0236555 A1 | 8/2015 | Takeda et al. | |
| 2019/0027983 A1* | 1/2019 | Michaelides | H02K 1/2773 |
| 2019/0222088 A1 | 7/2019 | Miyaji et al. | |
| 2020/0127511 A1* | 4/2020 | Matsubara | H02K 1/16 |
| 2021/0006111 A1* | 1/2021 | Matsuoka | H02K 1/2766 |

FOREIGN PATENT DOCUMENTS

| | | |
|---|---|---|
| JP | 2012-165482 A | 8/2012 |
| JP | 5353917 B2 | 11/2013 |
| JP | 2014-050208 A | 3/2014 |
| JP | 2015-171158 A | 9/2015 |
| JP | 2018-046703 A | 3/2018 |
| JP | 2018-085819 A | 5/2018 |
| WO | WO 2017/209302 A1 | 12/2017 |

\* cited by examiner

ROTOR OF ROTARY ELECTRIC MACHINE

CROSS-REFERENCE TO RELATED APPLICATIONS

This application is a Continuation Application of PCT Application No. PCT/JP2020/035584, filed Sep. 18, 2020 and based upon and claiming the benefit of priority from Japanese Patent Application No. 2019-173088, filed Sep. 24, 2019, the entire contents of all of which are incorporated herein by reference.

FIELD

Embodiments described herein relate generally to a rotor of a rotary electric machine having a permanent magnet.

BACKGROUND

Recently, research and development of permanent magnets have been remarkably advanced, and therefore permanent magnets of a high magnetic energy product are developed. Permanent magnet-type rotary electric machines which employ such a permanent magnet are applied as electric motors or power generators of electric trains and vehicles. Generally, a permanent magnet-type rotary electric machine comprises a cylindrical hollow stator and a columnar rotor rotatably supported inside the stator. The rotor comprises a rotor core and a plurality of permanent magnets embedded in the rotor core.

As such a permanent magnet-type rotary electric machine, there has been proposed a rotary electric machine having a configuration in which two magnets are arranged in a V shape per magnetic pole, and magnet slots accommodating the magnets are opened on a surface of the rotor core. In the rotary electric machine having the above configuration, it is possible to reduce magnetic flux leakage of the magnet in a bridge of the rotor core and to increase magnet torque generated per magnet weight. Alternatively, it is possible to reduce the magnet weight while maintaining the torque of the rotary electric machine.

However, in this configuration, under a situation where a large torque is generated, a strong bending stress is applied to the bridge located near the center of a magnetic pole by an electromagnetic force in a circumferential direction applied to a core portion located inside the magnets arranged in a V shape. Therefore, there is a possibility that the strength of the bridge is insufficient. Alternatively, in a case where the bridge is thickened for stress resistance, magnetic flux leakage increases, and it is difficult to reduce the magnet weight.

DETAILED DESCRIPTION

Embodiments will be described hereinafter with reference to the accompanying drawings.

In general, according to one embodiment, a rotor of a rotary electric machine comprises a rotor core including a plurality of magnetic poles arranged in a circumferential direction around a central axis, each of the magnetic poles including at least two magnet holding slots opposed to each other at intervals in the circumferential direction, a first core portion located between the two magnet holding slots in the circumferential direction, a second core portion located between the two magnet holding slots and the central axis, and a bridge connecting the first core portion and the second core portion; and a plurality of permanent magnets each arranged in the magnet holding slots. The bridge includes a plurality of first center bridges located between the two magnet holding slots and separated from each other in the circumferential direction, and a coupling element that connects the plurality of first center bridges to each other.

Throughout the embodiments, common configurations are given the same symbol, and duplicated explanations are omitted. Each figure is a schematic view for explaining the embodiments and facilitating understandings thereof, and the shape, the dimensions, the ratio and the like in the figure may be different from those of the actual apparatus, but they can be appropriately designed and changed by referring to the following descriptions and publicly known techniques.

First Embodiment

Figure 1:
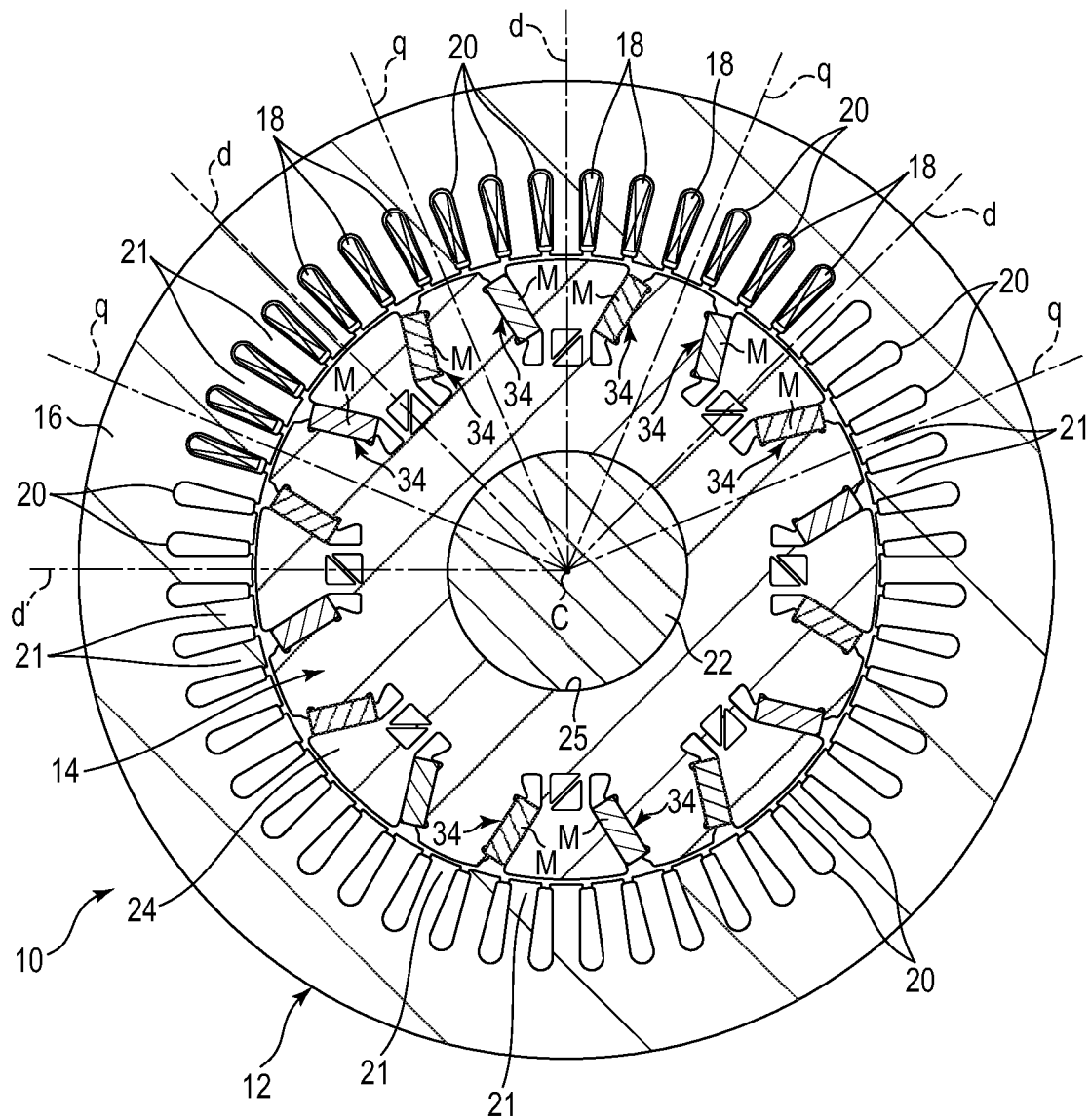
FIG. 1 is a cross-sectional view of a permanent magnet type rotary electric machine according to a first embodiment.
Figure 2:
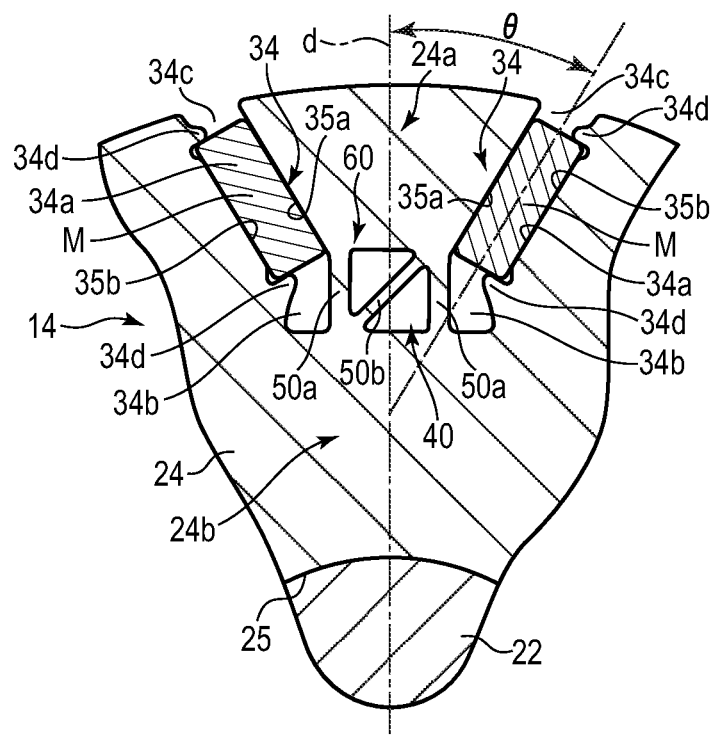
FIG. 2 is an enlarged cross-sectional view illustrating a part of a rotor of the rotary electric machine.

FIG. 1 is a cross-sectional view of a permanent magnet type rotary electric machine according to a first embodiment, and FIG. 2 is an enlarged cross-sectional view of a magnetic pole portion of a rotor.

As illustrated in FIG. 1, a rotary electric machine 10 is configured as, for example, an inner rotor type rotary electric machine, and comprises an annular or cylindrical stator 12 supported by a stationary frame (not illustrated), and a rotor 14 supported inside the stator so as to be rotatable about a central axis C and coaxially with the stator 12. The rotary electric machine 10 is applicable to, for example, a main electric motor, a drive motor or a power generator in railroad vehicles, hybrid vehicles (HEV) and electric vehicles (EV).

The stator 12 includes a cylindrical stator core 16 and an armature winding (coil) 18 wound around the stator core 16. The stator core 16 is configured by laminating a large number of annular electromagnetic steel plates (core pieces) made from a magnetic material such as silicon steel in a concentric manner. A plurality of slots 20 are formed in an inner peripheral portion of the stator core 16. A plurality of the slots 20 are arranged at equal intervals in a circumferential direction. Each of the slots 20 opens on an inner peripheral surface of the stator core 16 and extends in a radial direction from the inner peripheral surface. Further, each of the slots 20 extends over the entire length in an axial direction of the stator core 16. By forming a plurality of the slots 20, the inner peripheral portion of the stator core 16 constitutes a plurality (for example, 48 in the present embodiment) of stator teeth 21 facing the rotor 14. The armature winding 18 is inserted through a plurality of the slots 20 and wound around each of the stator teeth 21. By applying current to the armature winding 18, a predetermined interlinkage magnetic flux is formed in the stator 12 (stator teeth 21).

The rotor 14 includes a cylindrical shaft (rotating shaft) 22 whose both ends are rotatably supported by bearings (not illustrated), a cylindrical rotor core 24 fixed to a substantially center portion of the shaft 22 in the axial direction, and a plurality of permanent magnets M embedded in the rotor core 24. The rotor 14 is coaxially arranged with a slight gap (air gap) inside the stator 12. That is, an outer peripheral surface of the rotor 14 faces an inner peripheral surface of the stator 12 with a slight gap between them. The rotor core 24 has an inner hole 25 formed coaxially with the central axis C. The shaft 22 is inserted into and fitted to the inner hole 25 and extends coaxially with the rotor core 24. The rotor core 24 is configured as a laminated body in which a large number of annular electromagnetic steel plates (core pieces) made from a magnetic material such as silicon steel are laminated in a concentric manner. The rotor core 24 has the central axis C extending in a laminating direction of the core pieces and an outer peripheral surface coaxial with the central axis C.

In the present embodiment, the rotor 14 has a plurality of magnetic poles, for example, eight magnetic poles. In the rotor core 24, an axis passing through the central axis C and a boundary between magnetic poles adjacent in the circumferential direction and extending in a radial direction of the rotor core 24 is referred to as a q-axis, and an axis electrically separated by 90 degrees in the circumferential direction with respect to the q-axis, that is, an axis passing through the center of the magnetic pole and the central axis C is referred to as a d-axis. The q-axis is a direction in which the interlinkage magnetic flux formed by the stator 12 is likely to flow. The d-axis and the q-axis are alternately provided in the circumferential direction of the rotor core 24 in a predetermined phase. One magnetic pole of the rotor core 24 refers to a region between two of the q-axes adjacent to each other in the circumferential direction (⅛ circumferential angle region). In this manner, the rotor core 24 configured in eight poles (magnetic poles). The center in the circumferential direction of one magnetic pole is the d-axis.

As illustrated in FIGS. 1 and 2, a plurality of permanent magnets, for example, two of the permanent magnets M are embedded for each magnetic pole in the rotor core 24. In the circumferential direction of the rotor core 24, a magnet holding slot (may also be referred to as a magnet holding cavity portion or a magnet embedded hole) 34 for loading the permanent magnet M is formed on both sides of each of the d-axes. Each of two of the permanent magnets M is loaded and arranged in the magnet holding slot 34, and is fixed to the rotor core 24 by, for example, an adhesive.

As illustrated in FIG. 2, each of the magnet holding slots 34 penetrates the rotor core 24 in the axial direction. When viewed in a cross section orthogonal to the central axis C of the rotor core 24, two of the magnet holding slots 34 are formed and arranged line-symmetrically with respect to the d-axis, and are arranged side by side in a substantially V shape, for example.

Each of the magnet holding slots 34 functioning as a flux barrier includes a rectangular magnet loading region 34*a* corresponding to a cross-sectional shape of the permanent magnet M, an inner peripheral side cavity 34*b* extending from an inner peripheral side end of the magnet loading region 34*a*, and an outer peripheral side cavity 34*c* extending from an outer peripheral side end of the magnet loading region 34*a* and opened to the outer periphery of the rotor core 24. The rotor core 24 includes a pair of holding protrusions 34*d* protruding into the magnet holding slot 34 from an inner edge 35*b* of the magnet holding slot 34 at both ends in a longitudinal direction of the magnet loading region 34*a*.

The magnet loading region 34*a* is formed between a flat inner edge (long side on inner peripheral side) 35*b* and a flat outer edge (long side on outer peripheral side) 35*a* facing the inner edge 35*b* in parallel with a gap between them. The inner edge 35*b* and the outer edge 35*a* extend obliquely at an angle θ smaller than 90 degrees with respect to the d-axis. That is, the magnet loading region 34*a* is provided to be inclined such that the distance from the d-axis gradually increases from the inner peripheral side end toward the outer peripheral side end. The angle θ is not limited to the illustrated example and can be optionally changed.

The inner peripheral side cavity 34*b* extends substantially parallel to the d-axis from an inner peripheral side end (end on the d-axis side) of the magnet loading region 34*a* toward the central axis C. The inner peripheral side cavity 34*b* faces the d-axis at intervals. The outer peripheral side cavity 34*c* extends from the outer peripheral side end (the end on the outer peripheral surface side of the rotor core) of the magnet loading region 34*a* toward the outer peripheral surface of the rotor core 24, and is open or opened to the outer periphery of the rotor core 24.

The inner peripheral side cavity 34*b* and the outer peripheral side cavity 34*c* function as magnetic cavities (flux barriers) that suppress magnetic flux leakage from both end portions in the longitudinal direction of the permanent magnet M to the rotor core 24, and also contribute to weight reduction of the rotor core 24. Note that a pair of the holding protrusions 34*d* described above protrude from both ends in the longitudinal direction of the inner edge 35*b* into the inner peripheral side cavity 34*b* and the outer peripheral side cavity 34*c*.

The permanent magnet M is formed in, for example, an elongated flat plate shape having a rectangular cross section, and has a length substantially equal to an axial length of the rotor core 24. Each of the permanent magnets M is embedded over substantially the entire length of the rotor core 24. The permanent magnet M may be configured by combining a plurality of magnets divided in the axial direction (longitudinal direction), and in this case, the total length of a plurality of the magnets is substantially equal to the axial length of the rotor core 24.

As illustrated in FIG. 2, each of the permanent magnets M has a rectangular cross-sectional shape, and this cross section has a pair of long sides facing each other in parallel and a pair of short sides facing each other. A cross-sectional shape of the permanent magnet M is not limited to a rectangular shape (rectangle), and may be a parallelogram.

The permanent magnet M is loaded in the magnet loading region 34*a* of the magnet holding slot 34, and has a first long side abutting on the outer edge 35*a* and a second long side abutting on the inner edge 35*b*. A pair of short sides of the permanent magnet M abut on the holding protrusion 34*d*. In this manner, the permanent magnet M is held in the magnet loading region 34*a* in a state of being positioned in the longitudinal direction. The permanent magnet M may be fixed to the rotor core 24 with an adhesive or the like. Two of the permanent magnets M located on both sides of the d-axis are arranged side by side in a substantially V-shape. That is, two of the permanent magnets M are arranged such that the distance from the d-axis gradually increases from the inner peripheral side end toward the outer peripheral side end.

Each of the permanent magnets M is magnetized in a direction perpendicular to the long side. Two of the permanent magnets M located on both sides in the circumferential direction of the d-axis, that is, two of the permanent magnets M constituting one magnetic pole are arranged so as to have the same magnetization direction. Further, two of the permanent magnets M located on both sides in the circumferential direction of each of the q-axes are arranged so as to have magnetization directions in opposite directions. In the present embodiment, the rotary electric machine 10 constitutes a permanent magnet embedded type rotary electric machine having eight magnetic poles (four pole pairs) in which the front and back surfaces of the N pole and the S pole of the permanent magnet M are alternately arranged for each adjacent magnetic pole.

As illustrated in FIG. 2, the rotor core 24 includes, in each magnetic pole, a fan-shaped outer peripheral region (first core portion) 24a located between two of the magnet holding slots 34, an inner peripheral region (region (second core portion) between the magnet holding slot 34 and the inner hole 25 (shaft 22)) 24b of the rotor core 24, and a bridge 60 connecting the first core portion 24a and the second core portion 24b. The bridge 60 includes a center cavity 40 provided between two of the magnet holding slots 34, here, formed between two of the inner peripheral side cavities 34b, a plurality, for example, two of first center bridges 50a formed between each of the inner peripheral side cavities 34b and the center cavity 40, and a columnar second center bridge (coupling element) 50b extending to intersect the d-axis and connecting two of the first center bridges 50a to each other. The center cavity 40 is formed to penetrate the rotor core 24 in the axial direction. The center cavity 40 is formed in, for example, a substantially rectangular cross-sectional shape.

In one example, two of the first center bridges 50a are formed in a columnar shape extending substantially parallel to the d-axis. The second center bridge 50b functioning as a coupling element is formed in, for example, a columnar shape extending obliquely across the d-axis and the center cavity 40, and is connected to an outer peripheral side end portion (first end portion in the longitudinal direction) of a first one of the first center bridges 50a and an inner peripheral side end (second end portion in the longitudinal direction) of a second one of the first center bridges 50a. The second center bridge 50b connects two of the first center bridges 50a to increase the strength of the first center bridge 50a and the bridge 60, and also serves to connect the first core portion 24a and the second core portion 24b of the rotor core 24.

The second center bridge 50b may be provided to be inclined in the opposite direction without limitation to the inclination direction described above. That is, the second center bridge 50b may be formed in a columnar shape extending obliquely across the d-axis and the center cavity 40, and may be configured to connect an inner peripheral side end portion of the first one of the first center bridge 50a and an outer peripheral side end portion of the second one of the first center bridge 50a. Furthermore, the second center bridge 50b can also be provided so as to connect central portions in the longitudinal direction of two of the first center bridges 50a.

According to the rotor 14 of the rotary electric machine 10 according to the first embodiment configured as described above, since the bridge 60 of the rotor core 24 includes the second center bridge 50b connecting two of the first center bridges 50a, the strength of the first center bridge 50a can be improved without thickening of the first center bridge 50a. For the above reason, even in a case where an electromagnetic force in the circumferential direction is applied to the outer peripheral region 24a of the rotor core 24 under a situation where a large torque is generated, the outer peripheral region 24a can be stably supported by the first center bridge 50a and the second center bridge 50b. At the same time, since the leakage of the magnet magnetic flux is reduced, it is possible to increase the magnet torque generated per magnet weight. In this manner, torque and output in the rotary electric machine of the same size are improved, or the rotary electric machine can be reduced in size and weight while the same output is maintained. Furthermore, cost reduction of the rotor can be achieved by reduction of the weight of the magnet to be used.

Next, a rotor of a rotary electric machine according to another embodiment of the present invention will be described. Note that, in another embodiment described below, the same portions as those of the first embodiment described above are denoted by the same reference numerals, detailed description of them is omitted or simplified, and portions different from those of the first embodiment will be mainly described in detail.

Second Embodiment

Figure 3:
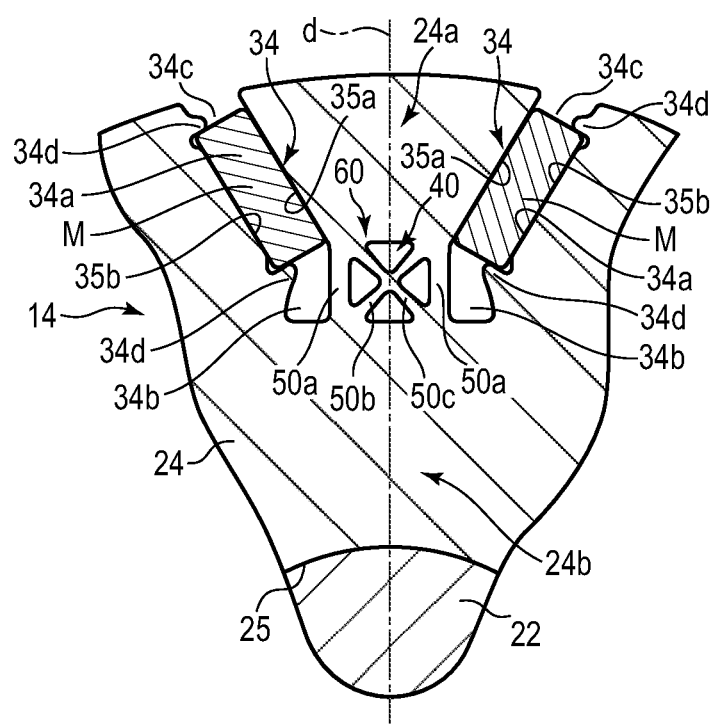
FIG. 3 is an enlarged cross-sectional view illustrating a part of the rotor of a rotary electric machine according to a second embodiment.

FIG. 3 is a cross-sectional view illustrating a part of a rotor of a rotary electric machine according to a second embodiment.

As illustrated in the drawing, according to the second embodiment, a bridge 60 of a rotor core 24 further includes a third center bridge 50c in addition to two of first center bridges 50a and a second center bridge 50b. The third center bridge 50c constituting a coupling element is formed in a columnar shape, extends while intersecting the d-axis and the second center bridge, and is connected to two of the first center bridges 50a. In one example, the third center bridge 50c extends obliquely in a direction opposite to the direction of the second center bridge 50b with respect to the d-axis, and connects an inner peripheral side end portion of a first one of the first center bridges 50a and an outer peripheral side end portion of a second one of the first center bridges 50a.

By providing the third center bridge 50c, the strength of the first center bridge 50a can be further improved.

Third Embodiment

Figure 4:
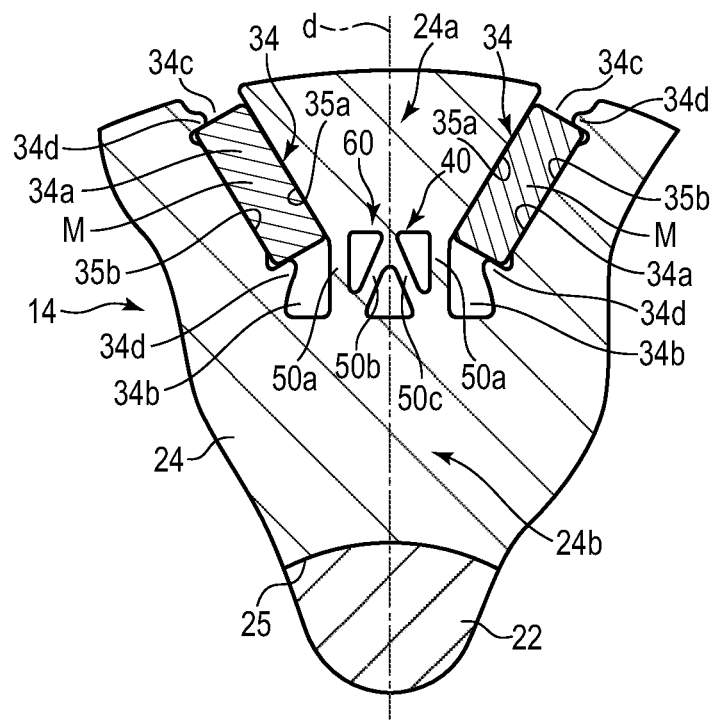
FIG. 4 is an enlarged cross-sectional view illustrating a part of the rotor of a rotary electric machine according to a third embodiment.

FIG. 4 is a cross-sectional view illustrating a part of a rotor of a rotary electric machine according to a third embodiment.

As illustrated in the drawing, according to the third embodiment, a bridge 60 of a rotor core 24 further includes a second center bridge 50b and a third center bridge 50c in addition to two of first center bridges 50a. The second center bridge 50b is formed in a columnar shape, and extends from an inner peripheral side end portion of a first one of the first center bridges 50a to an outer peripheral side end edge of a center cavity 40 on the d-axis through a center cavity 40. The third center bridge 50c is formed in a columnar shape, and extends from an inner peripheral side end portion of a second one of the first center bridges 50a to the outer peripheral side end edge of the center cavity 40 on the d-axis through the center cavity 40. As described above, the second center bridge 50b and the third center bridge 50c connect the inner peripheral side end portions of two of the first center bridges 50a to an outer peripheral region 24a of the rotor core 24, and connect two of the first center bridges 50a to each other.

Also in the third embodiment having the above configuration, it is possible to obtain the same action and effect as those of the second embodiment described above.

Fourth Embodiment

Figure 5:
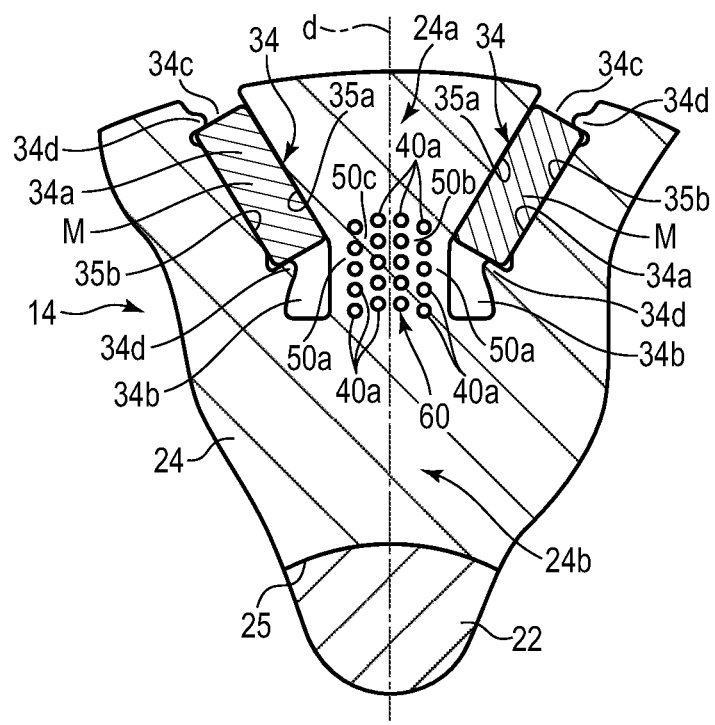
FIG. 5 is an enlarged cross-sectional view illustrating a part of the rotor of a rotary electric machine according to a fourth embodiment.

FIG. 5 is a cross-sectional view illustrating a part of a rotor of a rotary electric machine according to a fourth embodiment.

As illustrated in the drawing, according to the fourth embodiment, a center cavity 40 of a bridge 60 is formed by arranging a large number of punching holes 40a. A first center bridge 50a is formed between each of an inner peripheral side cavity 34b and the center cavity 40. A region between a large number of the punching holes 40a forms a plurality of coupling elements including a second center bridge 50b and a third center bridge 50c.

According to the above configuration, the punching hole 40a can be relatively easily machined, and the position and shape of the center bridge can be easily selected.

Fifth Embodiment

Figure 6:
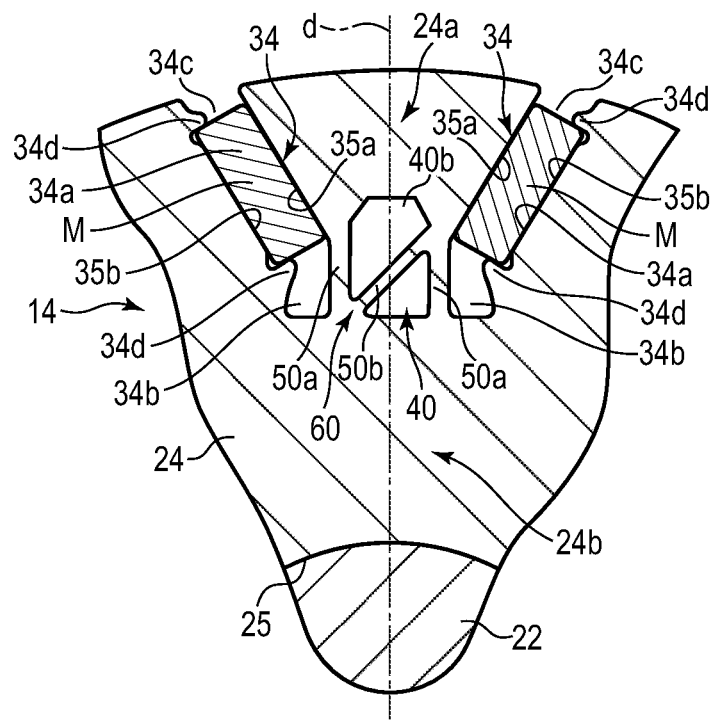
FIG. 6 is an enlarged cross-sectional view illustrating a part of the rotor of a rotary electric machine according to a fifth embodiment.

FIG. 6 is a cross-sectional view illustrating a part of a rotor of a rotary electric machine according to a fifth embodiment.

As illustrated in the drawing, according to the fifth embodiment, a bridge 60 of a rotor core 24 includes two of first center bridges 50a and a second center bridge 50b having a columnar shape that connects the first center bridges 50a to each other. A part of a center cavity 40 extends from a region between a pair of inner peripheral side cavities 34b to the outer peripheral surface side of the rotor core 24 to form an extending portion 40b.

Sixth Embodiment

Figure 7:
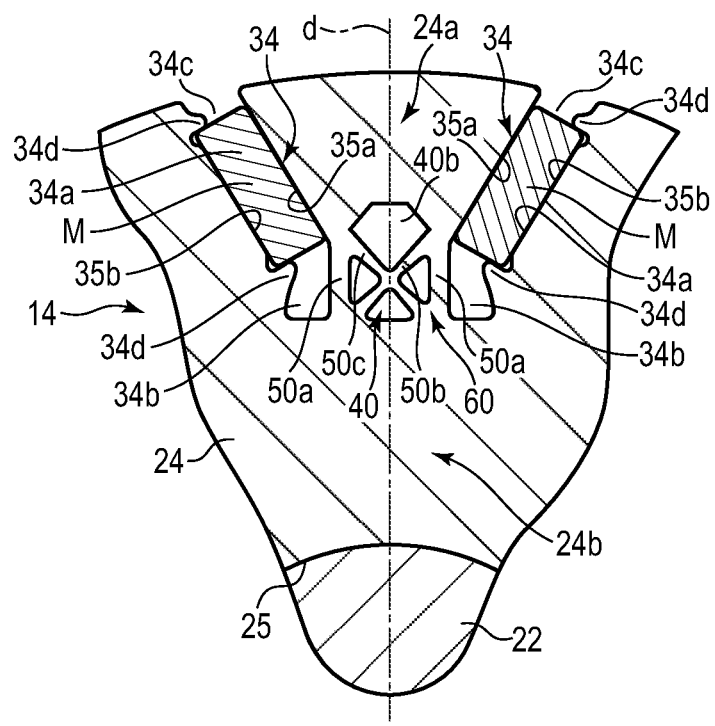
FIG. 7 is an enlarged cross-sectional view illustrating a part of the rotor of a rotary electric machine according to a sixth embodiment.

FIG. 7 is a cross-sectional view illustrating a part of a rotor of a rotary electric machine according to a sixth embodiment.

As illustrated in the drawing, according to the sixth embodiment, a bridge 60 of a rotor core 24 includes two of first center bridges 50a, a second center bridge 50b having a columnar shape that connects the first center bridges 50a to each other, and a third center bridge 50c. A part of a center cavity 40 extends from a region between a pair of inner peripheral side cavities 34b to the outer peripheral surface side of the rotor core 24 to form an extending portion 40b.

According to the fifth embodiment and the sixth embodiment, by enlarging a center cavity 40 to the outer peripheral surface side of the rotor core 24, it is possible to reduce the weight of an outer peripheral region 24a of the rotor core 24. It is desirable that an extending portion 40b of the center cavity 40 extend in a tapered manner, that is, extend obliquely toward the d-axis so that the width of two of the first center bridges 50a do not become small.

Seventh Embodiment

Figure 8:
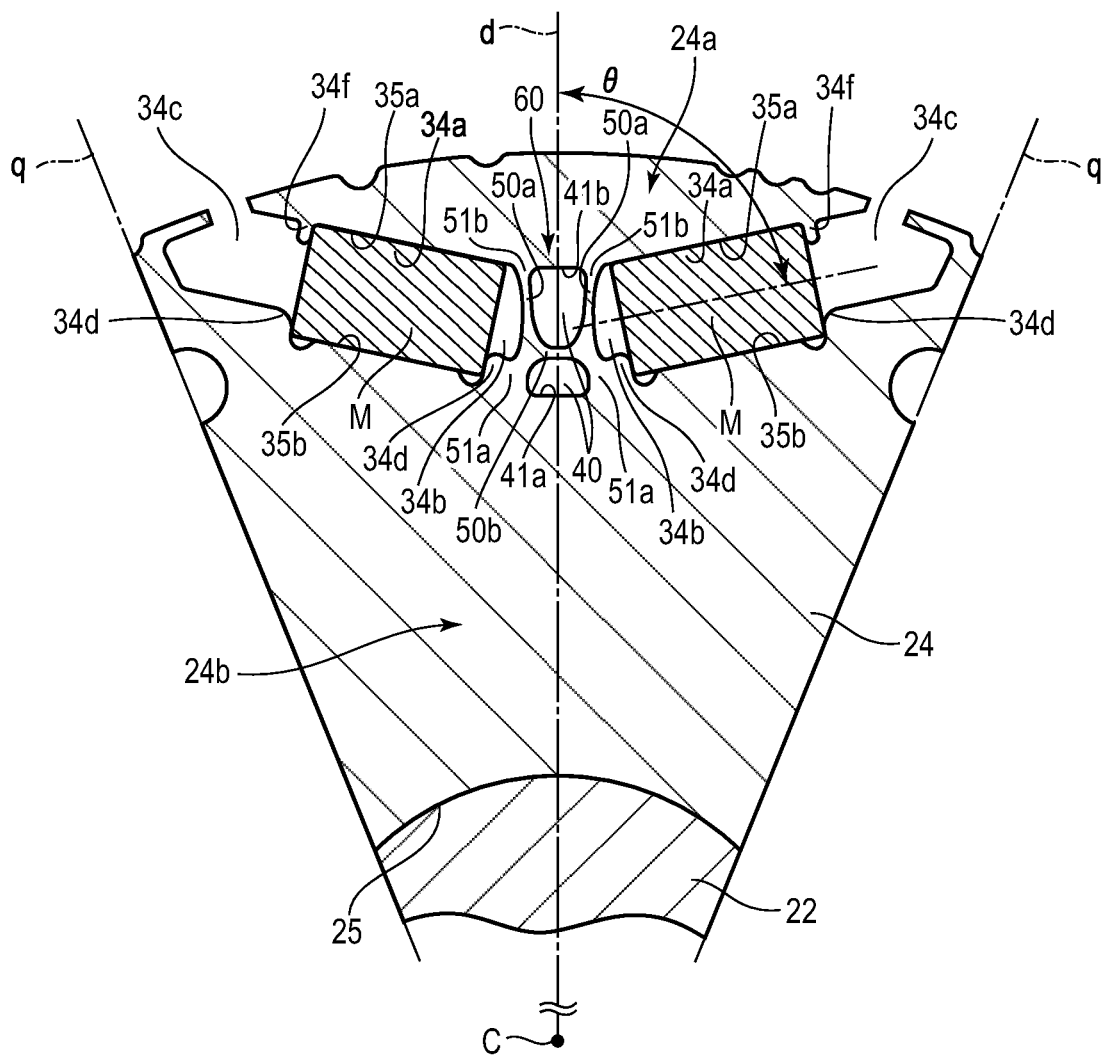
FIG. 8 is an enlarged cross-sectional view illustrating a part of the rotor of a rotary electric machine according to a seventh embodiment.

FIG. 8 is a cross-sectional view illustrating a part of a rotor of a rotary electric machine according to a seventh embodiment.

As illustrated in the drawing, according to the seventh embodiment, in the circumferential direction of a rotor core 24, a magnet holding slot 34 for loading a permanent magnet M is formed on both sides of a d-axis. Each of two of the permanent magnets M is loaded and arranged in the magnet holding slot 34, and is fixed to the rotor core 24 by, for example, an adhesive.

Each of the magnet holding slots 34 penetrates the rotor core 24 in the axial direction. When viewed in a cross section orthogonal to the central axis C of the rotor core 24, two of the magnet holding slots 34 are formed and arranged line-symmetrically with respect to the d-axis, and are arranged side by side in a substantially V shape, for example.

Each of the magnet holding slots 34 functioning as a flux barrier has a rectangular magnet loading region 34a corresponding to a cross-sectional shape of the permanent magnet M, an inner peripheral side cavity 34b extending from an inner peripheral side end of the magnet loading region 34a to the side of the d-axis, and an outer peripheral side cavity 34c extending from an outer peripheral side end of the magnet loading region 34a and opened to the outer periphery of the rotor core 24. The magnet loading region 34a is formed between a flat inner edge (inner peripheral side long side) 35b and a flat outer edge (outer peripheral side long side) 35a facing the inner edge 35b in parallel with a gap between them. The rotor core 24 has a pair of holding protrusions 34d protruding into the magnet holding slot 34 from the inner edge 35b of the magnet holding slot 34 at both ends in the longitudinal direction of the magnet loading region 34a, and a holding protrusion 34f protruding into the magnet holding slot 34 from an end on the outer peripheral side of the outer edge 35a.

The inner edge 35b and the outer edge 35a of the magnet loading region 34a extend obliquely at an angle smaller than 90 degrees with respect to the d-axis. That is, the magnet loading region 34a is provided to be inclined such that the distance from the d-axis gradually increases from the inner peripheral side end toward the outer peripheral side end. In the seventh embodiment, the angle $\theta$ is set to be larger than the angle $\theta$ in the first embodiment described above, and is set to, for example, 70 to 80 degrees.

The inner peripheral side cavity 34b extends from an inner peripheral side end (end on the d-axis side) of the magnet loading region 34a toward the d-axis, and faces the d-axis at intervals in substantially parallel. The outer peripheral side cavity 34c extends from the outer peripheral side end (the end on the outer peripheral surface side of the rotor core) of the magnet loading region 34a toward the outer peripheral surface of the rotor core 24, and is open or opened to the outer periphery of the rotor core 24.

The inner peripheral side cavity 34b and the outer peripheral side cavity 34c function as magnetic gaps (flux barriers) that suppress magnetic flux leakage from both end portions in the longitudinal direction of the permanent magnet M to the rotor core 24, and also contribute to weight reduction of the rotor core 24. Note that a pair of the holding protrusions 34d described above protrude from both ends in the longitudinal direction of the inner edge 35b into the inner peripheral side cavity 34b and the outer peripheral side cavity 34c. The holding protrusion 34f protrudes from one end of the outer edge 35a to the outer peripheral side cavity 34c.

The permanent magnet M is formed in an elongated flat plate shape having a rectangular cross section. The cross section of the permanent magnet M has a pair of long sides facing each other in parallel and a pair of short sides facing each other. The permanent magnet M is loaded in the magnet loading region 34a of the magnet holding slot 34, and has a first long side abutting on the outer edge 35a and a second long side abutting on the inner edge 35b. A pair of short sides of the permanent magnet M abut on the holding protrusion 34d. A short side located on the outer peripheral side also abuts on the holding protrusion 34f. In this manner, the permanent magnet M is held in the magnet loading region 34a in a state of being positioned in the longitudinal direction. The permanent magnet M may be fixed to the rotor core 24 with an adhesive or the like. Two of the permanent magnets M located on both sides of the d-axis are arranged side by side in a substantially V-shape. That is, two of the permanent magnets M are arranged such that the distance from the d-axis gradually increases from the inner peripheral side end toward the outer peripheral side end. The magnetization direction of the permanent magnet M is the same as the magnetization direction in the first embodiment described above.

The rotor core 24 includes, in each magnetic pole, a fan-shaped outer peripheral region (first core portion) 24a located between two of magnet holding slots 34, an inner peripheral region (region (second core portion) between the magnet holding slot 34 and an inner hole 25 (shaft 22)) 24b of the rotor core 24, and a bridge 60 connecting the first core portion 24a and the second core portion 24b. The bridge 60 includes a center cavity 40 provided between two of the magnet holding slots 34, here, formed between two of the inner peripheral side cavities 34b, a plurality, for example, two of first center bridges 50a formed between each of the inner peripheral side cavities 34b and the center cavity 40, and a columnar second center bridge (coupling element) 50b extending to intersect the d-axis and connecting two of the first center bridges 50a to each other. The center cavity 40 is formed to penetrate the rotor core 24 in the axial direction. The center cavity 40 is formed in, for example, a substantially rectangular cross-sectional shape, and is separated into two parts in the radial direction by the second center bridge 50b as described later.

In one example, two of the first center bridges 50a are formed in a columnar shape extending substantially parallel to the d-axis. According to the present embodiment, each of the first center bridges 50a extends from a position connecting the inner edge 35b of the magnet loading region 34a and an end edge 41a on the side of the central axis C of the center cavity 40 to a position connecting the outer edge 35a of the magnet loading region 34a and an end edge 41b on the outer peripheral side of the center cavity 40. In the present embodiment, the holding protrusion 34d protrudes from the inner peripheral side end (first end portion 51a) of the first center bridge 50a. Each of the first center bridges 50a is formed such that the width of a center portion in the longitudinal direction is the narrowest, the width gradually increases from the center portion toward the first end portion 51a on the inner peripheral side, and the width gradually increases from the center portion toward a second end portion 51b on the outer peripheral side.

In the second end portion 51b, a corner portion connected to the outer edge 35a of the magnet loading region 34a and a corner portion connected to the end edge 41b of the center cavity 40 are curved in an arc shape. In one example, the curvature of the corner portion connected to the outer edge 35a is set to be smaller than the curvature of the corner portion connected to the end edge 41b.

The second center bridge 50b functioning as a coupling element extends substantially orthogonal to the d-axis in the center cavity 40, connects a pair of the first center bridges 50a to each other, and separates the center cavity 40 into two, upper and lower parts in the radial direction. At both ends of the second center bridge 50b connected to the first center bridge 50a, in the radial direction of the rotor core 24, the second center bridge 50b is provided on the inner side than the center portion in the longitudinal direction of the first center bridge 50a and on the outer side than the holding protrusion 34d. In both end portions of the second center bridge 50b connected to the first center bridge, each corner portion at which a side edge of the second center bridge 50b and an inner edge of the center cavity 40 are connected is curved in an arc shape. In this manner, the second center bridge 50b is formed such that the width of a center portion in the longitudinal direction is the narrowest and the width gradually increases from the center portion toward each end.

In the seventh embodiment, other configurations of the rotary electric machine are similar to the configuration of the rotary electric machine according to the first embodiment described above.

According to the seventh embodiment having the above configuration, since the second center bridge 50b that connects two of the first center bridges 50a to each other is provided, the strength of the first center bridge 50a and the bridge 60 can be improved. Other than the above, in the seventh embodiment, the same action and effect as those of the first embodiment described above can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the number of magnetic poles, dimension, shape, and the like of the rotor are not limited to those in the above-described embodiment, and can be variously changed according to the design. The number of permanent magnets installed in each magnetic pole of the rotor is not limited to two, and can be increased as necessary. The number of the first center bridges constituting the bridge is not limited to two, and may be three or more.

What is claimed is:

1. A rotor of a rotary electric machine, the rotor comprising:
    a rotor core including a plurality of magnetic poles arranged in a circumferential direction around a central axis, each of the magnetic poles including at least two magnet holding slots opposed to each other at intervals in the circumferential direction, a first core portion located between the two magnet holding slots in the circumferential direction, a second core portion located between the two magnet holding slots and the central axis, and a bridge connecting the first core portion and the second core portion; and
    a plurality of permanent magnets each arranged in the magnet holding slot, wherein when an axis passing through a center in the circumferential direction of the magnetic pole and the central axis is defined as a d-axis and an axis passing through the central axis and a boundary between magnetic poles adjacent in the circumferential direction and extending in a radial direction is defined as a q-axis, in a cross section of the rotor core orthogonal to the central axis, the magnetic poles includes two of the magnet holding slots provided on both sides in the circumferential direction of the d-axis, and a core portion located on the q-axis and forming a magnetic path that passes magnetic flux, the bridge includes a plurality of first center bridges located between the d-axis and the two magnet holding slots and separated from each other in the circumferential direction, and a coupling element that connects the plurality of first center bridges to each other.

2. The rotor of claim 1, wherein
the plurality of first center bridges are provided substantially parallel to the d-axis between the d-axis and the magnet holding slots, and the coupling element includes a second center bridge extending to intersect the d-axis and connected to the plurality of first center bridges.

3. The rotor of claim 2, wherein the second center bridge is connected to one axial end portion in a longitudinal direction of one of the first center bridges and an opposite end portion in the longitudinal direction of another one of the first center bridges.

4. The rotor of claim 3, wherein the coupling element further includes a third center bridge extending to intersect the second center bridge and connecting the plurality of first center bridges.

5. The rotor of claim 2, wherein the second center bridge extends orthogonal to the d-axis and is connected to the plurality of first center bridges.

6. The rotor of claim 1, wherein the bridge includes a plurality of through holes provided side by side at intervals between the plurality of first center bridges, and the coupling element is formed by a core portion located between the plurality of through holes.

7. The rotor of claim 1, wherein each of the two magnet holding slots includes an inner peripheral side magnetic cavity opposing the d-axis with intervals, an outer peripheral side magnetic cavity opened to an outer periphery of the rotor core, and a magnet loading region located between the inner peripheral side magnetic cavity and the outer peripheral side magnetic cavity and loaded with the permanent magnet, and the first center bridges are located between the inner peripheral side magnetic cavities of the two magnet holding slots and separated from each other in the circumferential direction.

8. The rotor of claim 7, wherein the rotor core comprises a holding protrusion that protrudes from an end portion of the first center bridge to the inner peripheral side magnetic cavity and abuts on the permanent magnet.

* * * * *